United States Patent
Andre et al.

(10) Patent No.: US 9,771,485 B2
(45) Date of Patent: *Sep. 26, 2017

(54) METALLIC NANOPARTICLE DISPERSION

(71) Applicant: AGFA-GEVAERT, Mortsel (BE)

(72) Inventors: Xavier Andre, Mortsel (BE); Dirk Bollen, Mortsel (BE)

(73) Assignee: AGFA-GEVAERT, Mortsel (BE)

(*) Notice: Subject to any disclaimer, the term of this patent is extended or adjusted under 35 U.S.C. 154(b) by 153 days.

This patent is subject to a terminal disclaimer.

(21) Appl. No.: 14/405,207

(22) PCT Filed: Jun. 5, 2013

(86) PCT No.: PCT/EP2013/061554
§ 371 (c)(1),
(2) Date: Dec. 3, 2014

(87) PCT Pub. No.: WO2013/182588
PCT Pub. Date: Dec. 12, 2013

(65) Prior Publication Data
US 2015/0159029 A1    Jun. 11, 2015

Related U.S. Application Data

(60) Provisional application No. 61/656,024, filed on Jun. 6, 2012.

(30) Foreign Application Priority Data

Jun. 5, 2012 (EP) ..................... 12170774

(51) Int. Cl.
C09D 7/00 (2006.01)
C09D 5/24 (2006.01)
C09D 11/52 (2014.01)
C09D 17/00 (2006.01)
C09D 11/033 (2014.01)
C09D 11/30 (2014.01)

(52) U.S. Cl.
CPC .............. C09D 7/001 (2013.01); C09D 5/24 (2013.01); C09D 11/033 (2013.01); C09D 11/30 (2013.01); C09D 11/52 (2013.01); C09D 17/006 (2013.01); C09D 17/007 (2013.01)

(58) Field of Classification Search
None
See application file for complete search history.

(56) References Cited

U.S. PATENT DOCUMENTS

| 4,896,250 A | 1/1990 | Sullivan | |
|---|---|---|---|
| 2007/0154644 A1 | 7/2007 | Hwang et al. | |
| 2008/0145560 A1* | 6/2008 | Khaselev | C09D 11/30 427/466 |
| 2009/0008142 A1* | 1/2009 | Shimizu | B32B 5/18 174/261 |
| 2009/0242854 A1 | 10/2009 | Li et al. | |
| 2009/0258202 A1* | 10/2009 | Sakaguchi | B22F 9/24 428/206 |
| 2009/0321689 A1 | 12/2009 | Harada et al. | |
| 2010/0059260 A1 | 3/2010 | Takemoto et al. | |

FOREIGN PATENT DOCUMENTS

| EP | 1 887 056 A1 | 2/2008 |
|---|---|---|
| EP | 2 050 792 A1 | 4/2009 |
| EP | 2 147 733 A1 | 1/2010 |
| EP | 2 468 827 A1 | 6/2012 |
| EP | 2 608 217 A1 | 6/2013 |
| EP | 2 608 218 A1 | 6/2013 |
| JP | 02-126511 A | 5/1990 |
| WO | 2006/072959 A1 | 7/2006 |
| WO | 2008/021472 A2 | 2/2008 |
| WO | 2008/038867 A1 | 4/2008 |
| WO | 2011/052966 A2 | 5/2011 |

OTHER PUBLICATIONS

Official Communication issued in International Patent Application No. PCT/EP2013/061554, mailed on Sep. 5, 2013.
Andre et al., "Dispersion Comprising Metallic, Metal Oxide or Metal Precursor Nanoparticles, a Polymeric Dispersant and a Thermally Cleavable Agent," U.S. Appl. No. 14/363,336, filed Jun. 6, 2014.
Andre et al., "Dispersion Comprising Metallic, Metal Oxide or Metal Precursor Nanoparticles, a Polymeric Dispersant and a Sintering Additive," U.S. Appl. No. 14/363,338, filed Jun. 6, 2014.
Andre et al., "Dispersion Comprising Metallic, Metal Oxide or Metal Precursor Nanoparticles," U.S. Appl. No. 13/996,399, filed Sep. 25, 2013.

* cited by examiner

Primary Examiner — Michael Wieczorek
Assistant Examiner — Bradford Gates
(74) Attorney, Agent, or Firm — Keating and Bennett, LLP

(57) ABSTRACT

A metallic nanoparticle dispersion includes a dispersion medium characterized in that the dispersion medium includes a solvent according to Formula I,

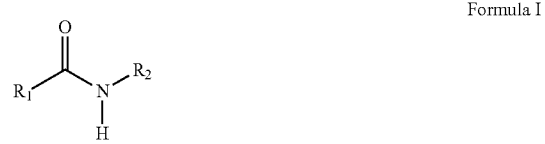

Formula I wherein $R_1$ and $R_2$ represent an optionally substituted alkyl group, and $R_1$ and $R_2$ may form a ring. When using a solvent according to Formula I as a dispersion medium, no polymeric dispersants are necessary to obtain stable metallic nanoparticle dispersions.

11 Claims, No Drawings

METALLIC NANOPARTICLE DISPERSION

CROSS-REFERENCE TO RELATED APPLICATIONS

This application is a 371 National Stage Application of PCT/EP2013/061554, filed Jun. 5, 2013. This application claims the benefit of U.S. Provisional Application No. 61/656,024, filed Jun. 6, 2012, which is incorporated by reference herein in its entirety. In addition, this application claims the benefit of European Application No. 12170774.9, filed Jun. 5, 2012, which is also incorporated by reference herein in its entirety.

BACKGROUND OF THE INVENTION

1. Field of the Invention

The present invention relates to a metallic nanoparticle dispersion comprising a specific solvent as dispersion medium, and to metallic inks and pastes prepared thereof. The specific solvent confers to the dispersion improved stability in the absence of polymeric dispersants. The invention also relates to conductive layers and patterns formed with these metallic inks or pastes at moderate curing conditions.

2. Description of the Related Art

The interest in metallic printing or coating fluids, also referred to in this application as respectively a metallic ink or metallic coating solution, has increased during the last decades due to their unique properties when compared to the bulk properties of a given metal. For example, the melting point of metallic nanoparticles decreases with decreasing particle size making them of interest for printed electronics, electrochemical, optical, magnetic and biological applications.

The production of stable and concentrated metallic printing or coating fluids which can be printed, for example by inkjet printing, or coated at high speed is of great interest as it enables the preparation of electronic devices at low costs.

Usually, the main component of metallic printing or coating fluids is a metallic nanoparticle dispersion comprising metallic nanoparticles, a dispersant, typically a polymeric dispersant, and a dispersion medium. Such metallic nanoparticle dispersions can be directly used as a printing or coating fluid. However, additional ingredients are often added to the metallic nanoparticle dispersion to optimize the properties of the resulting metallic printing or coating fluids.

Usually, the preparation of metallic printing or coating fluids comprising metallic nanoparticles is carried out in water or organic solvents by the polyol synthesis methodology as disclosed in Mat. Chem. Phys. 114, 549-555, by a derivative of the polyol synthesis methodology or by an in-situ reduction of metallic salts in the presence of various reducing agents. Such methods are disclosed in for example US2010143591, US2009142482, US20060264518 and US20080220155, EP2147733, EP2139007, EP803551, EP2012952, EP2030706, EP1683592, EP166617, EP2119747, EP2087490 and EP2010314, WO2008/151066, WO2006/076603, WO2009/152388 and WO2009/157393.

Among others, the dilution of metallic nanoparticle dispersions, usually less than 1 wt % of metallic particles, is a severe drawback. Indeed, such highly diluted metallic nanoparticle dispersions cannot directly be used to prepare printing or coating fluids that require at least 5 wt % of metallic nanoparticles. An additional concentration step of the diluted metallic nanoparticle dispersion is then necessary before it can be used in the preparation of the printing or coating fluids.

WO2006/072959 discloses the production of silver nanoparticles compositions up to 35 wt % in water but the method still requires additional purification and isolation steps that impart drastically their industrialization and the scope of their applications.

A metallic nanoparticle dispersion typically comprises metallic nanoparticles, a dispersant, typically a polymeric dispersant, and a dispersion medium.

The presence of a polymeric dispersant is usually mandatory to obtain stable metallic printing or coating fluids. Non-stable metallic nanoparticle dispersions may lead to irreversible phase separation causing among others the clogging of the coating or print heads, which are usually only a few micrometers in diameter.

Polymeric dispersants typically contain in one part of the molecule so-called anchor groups, which adsorb onto the metallic particles to be dispersed. In another part of the molecule, polymeric dispersants have polymer chains compatible with the dispersion medium and all the ingredients present in the final printing or coating fluids.

Polymeric dispersants are typically homo- or copolymers prepared from acrylic acid, methacrylic acid, vinyl pyrrolidinone, vinyl butyral, vinyl acetate or vinyl alcohol monomers.

Typically, after applying the metallic printing or coating fluids on a substrate, a sintering step, also referred to as curing step, at elevated temperatures is carried out to induce/enhance the conductivity of the applied patterns of layers. The organic components of the metallic printing or coating fluids, for example the polymeric dispersants, may reduce the sintering efficiency and thus the conductivity of the applied patterns of layers. For this reason, higher sintering temperatures and longer sintering times are often required to decompose the organic components.

Typical polymeric dispersants, such as those described above, are characterized by a full decomposition temperature of at least 350° C. Therefore, the layers or patterns coated or printed with metallic printing or coating fluids comprising such polymeric dispersants typically require a sintering step at elevated temperatures to be sure that most of the polymeric dispersants are decomposed.

Such high sintering temperatures are not compatible with common polymer foils, such as polyethylene terephthalate (PET) or polycarbonate, which have relatively low glass transition temperatures. This restricts the choice to more expensive polymers such as polyimide.

There is thus an interest in lowering the sintering temperatures needed to obtain conductive layers or patterns.

EP-A 10196244.7 filed on 21 Dec. 2010 discloses polymeric dispersants that has a 95 wt % decomposition at a temperature below 300° C. as measured by Thermal Gravimetric Analysis. By using metallic printing or coating fluids comprising such polymeric dispersants, the sintering temperature and time could be reduced.

In EP-A 11194791.7 and EP-A 11194790.9 both filed on 21 Dec. 2011 a so called sintering additive is used in combination with a polymeric dispersant of EP-A 10196244.7 to further lower the sintering temperature.

SUMMARY OF THE INVENTION

A preferred embodiment of the present invention provides a stable metallic nanoparticle dispersion comprising a specific solvent as dispersion medium. When using such a solvent as dispersing medium, no polymeric dipsersant has to be present to obtain a stable dispsersion. Due to the absence of a polymeric dispersant in the resulting metallic printing or coating fluids, a reduction of the sintering temperature and/or time of layers or pattern obtained with these metallic printing or coating fluids could be realized.

A further preferred embodiment of the invention provides a printing or coating fluid obtained from the metallic nanoparticle dispersion.

Further advantages and preferred embodiments of the present invention will become apparent from the following description and the dependent claims.

DETAILED DESCRIPTION OF THE PREFERRED EMBODIMENTS

A preferred embodiment of the present invention relates to a metallic nanoparticle dispersion comprising a dispersion medium characterized in that the dispersion medium comprises a solvent according to Formula I,

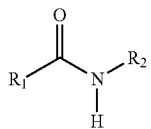

Formula I wherein
$R_1$ and $R_2$ represent an optionally substituted alkyl group, and
$R_1$ and $R_2$ may form a ring.

Metallic Nanoparticles

The dispersion according to a preferred embodiment of the present invention comprises metallic nanoparticles.

The metallic nanoparticles comprise one or more metals in elemental or alloy form. The metal is preferably selected from the group consisting of silver, gold, copper, nickel, cobalt, molybdenum, palladium, platinum, tin, zinc, titanium, chromium, tantalum, tungsten, iron, rhodium, iridium, ruthenium, osmium, aluminium and lead. Metallic nanoparticles based on silver, copper, molybdenum, aluminium, gold, copper, or a combination thereof, are particularly preferred. Most preferred are metallic nanoparticles based on silver.

The metallic nanoparticles may be prepared from metal precursor particles by means of an additional step such as a reduction step, for example the reduction of metal oxides to metals. Metal precursor nanoparticles may be selected from the groups of metal oxides, metal salts or metal hydroxides.

Preferred metal oxide nanoparticles are based on silver oxide, tin oxide, titanium oxide, zirconium oxide, wolfram oxide, molybdenum oxide, cadmium oxide, cupper oxide or zinc oxide.

Also doped metal oxide nanoparticles such as ZnO:Al, $SnO_2$:F or $SnO_2$:Sb may be used.

Preferred metal hydroxide particles are based on copper hydroxide, titanium hydroxide, zirconium hydroxide, wolfram hydroxide, molybdenum hydroxide, cadmium hydroxide or zinc hydroxide.

Preferred metal salts include inorganic acid salts, such as nitrates, carbonates, chlorides, phosphates, borates, sulfonates and sulfates, and organic acid salts, such as stearate, myristate or acetate.

As mentioned above, particularly preferred metallic nanoparticles are silver nanoparticles. These may be prepared, for example, by the reduction of silver oxide or silver acetate.

The term "nanoparticles" refers to dispersed particles having an average particle size below 100 nm at the end of the dispersion preparation. The metallic nanoparticles have an average particle size at the end of the dispersion preparation of less than 100 nm, preferably less than 50 nm, more preferably less than 30 nm, most preferably less than 20 nm.

Dispersion Medium

Another preferred embodiment of the present invention relates to a metallic nanoparticle dispersion comprising a dispersion medium characterized in that the dispersion medium comprises a solvent according to Formula I,

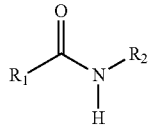

Formula I wherein
$R_1$ and $R_2$ represent an optionally substituted alkyl group, and
$R_1$ and $R_2$ may form a ring.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

In a preferred embodiment the dispersion medium comprises a solvent according to Formula II,

Formula II wherein
L is an optionally substituted linear or branched $C_2$-$C_{11}$ alkylene group.

In a more preferred embodiment the dispersion medium comprises a solvent selected from an optionally substituted 2-pyrrolidone, β-lactam, γ-lactam, δ-lactam, or ε-lactam.

In an even more preferred embodiment the metallic nanoparticle dispersion comprises as dispersion medium a solvent selected from 2-pyrrolidone, 4-hydroxy-2-pyrrolidone, δ-valerolactam or ε-caprolactam.

In a most preferred embodiment the dispersion medium comprises 2-pyrrolidone.

The metallic nanoparticle dispersion comprises the solvent as defined above in an amount between 1 and 99 wt %, preferably between 5 and 90 wt %, more preferably between 10 and 70 wt %, most preferably between 20 and 50 wt %, relative to the total weight of the dispersion.

The dispersion medium of the metallic nanoparticle dispersion may comprise, in addition to the solvent according to Formula I, a co-solvent, preferably an alcohol or a ketone. The co-solvent is more preferably ethanol or methylethyl ketone (MEK). The co-solvent may be present from the start of the preparation of the metallic nanoparticle dispersion or may be added during or at the end of the preparation.

The amount of co-solvent is preferably between 0 and 75 wt %, more preferably between 5 and 70 wt % relative to the total dispersion medium amount.

Polymeric Dispersant

Polymeric dispersants typically contain in one part of the molecule so-called anchor groups, which adsorb onto the metallic particles to be dispersed. In another part of the molecule, polymeric dispersants have polymer chains compatible with the dispersion medium, also referred to as liquid vehicle, and all the ingredients present in the final printing or coating fluids.

Polymeric dispersants are typically homo- or copolymers prepared from acrylic acid, methacrylic acid, vinyl pyrrolidinone, vinyl butyral, vinyl acetate or vinyl alcohol monomers.

The polymeric dispersants disclosed in EP-A 10196244.7, filed on 21 Dec. 2010, having a 95 wt % decomposition at a temperature below 300° C. as measured by Thermal Gravimetric Analysis may also be used.

However, in a preferred embodiment the metallic nanoparticle dispersion according to the present invention comprises less than 5 wt % of a polymeric dispersant relative to the total weight of the dispersion, more preferably less than 1 wt %, most preferably less than 0.1 wt %. In a particularly preferred embodiment the dispersion comprises no polymeric dispersant at all.

Preparation of the Metallic Nanoparticles Dispersion.

The metallic nanoparticle dispersion according to a preferred embodiment of the present invention is prepared by dispersing the metal(s) or the metal precursor(s) in the presence of the dispersion medium disclosed above. Dispersing methods include precipitation, mixing, milling, in-situ synthesis or a combination thereof. The experimental conditions such as temperature, process time, energy input, etc. depend on the methodology chosen. The dispersion process can be carried out in a continuous, batch or semi-batch mode.

Mixing apparatuses may include a pressure kneader, an open kneader, a planetary mixer, a dissolver, a high shear stand mixer, and a Dalton Universal Mixer. Suitable milling and dispersion apparatuses are a ball mill, a pearl mill, a colloid mill, a high-speed disperser, double rollers, a bead mill, a paint conditioner, and triple rollers. Many different types of materials may be used as milling media, such as glasses, ceramics, metals, and plastics. The dispersions may also be prepared using ultrasonic energy.

The term "nanoparticles" refers to dispersed particles having an average particle size below 100 nm at the end of the dispersion preparation. Before the dispersion preparation step, the metallic particles or the metal precursor particles are typically available as powders, flakes, particles or aggregated particles. When their average size is above 100 nm, the dispersion step includes necessarily a down-sizing step including the actions of milling or de-aggregating until the particles size is lowered to the nanoparticle range. Prior to the dispersion preparation the flakes or powders can be down-sized by mean of dry milling, wet-milling, or sieving techniques. The conversion of metal precursor(s) to metal(s) can be concomitant to the down-sizing step.

In preferred embodiment the metallic nanoparticle dispersion is a low viscous fluid having a viscosity between 3 and 1000 mPa·s, measured between 23° C. and 45° C. and comprising between 5 and 45 wt %, more preferably between 10 and 40 wt % of metallic nanoparticles.

In another preferred embodiment the metallic nanoparticle dispersion is a high viscous fluid, also referred to as a paste, having a viscosity between 1000 and 10000 mPa·s, measured between 23° C. and 45° C. and comprising at least 30 wt %, preferably at least 45 wt % of metallic nanoparticles. Such a highly concentrated paste may be prepared, starting for example from a low concentrated dispersion, by ultrafiltration, solvent evaporation, complete or non-complete precipitation or sedimentation in a non-solvent, by centrifugation or by ultracentrifugation.

In a preferred embodiment the metallic nanoparticle dispersion is prepared by an in-situ reduction under mixing of a metal precursor such as a metal oxide, a metal hydroxide, a metal salt or a combination thereof, in the presence of a reducing agent in the dispersion medium.

The degree of reduction of the metal precursor to metallic nanoparticles is preferably between 60 and 100%.

The reducing agents are soluble in the dispersion medium and can be selected from the groups of hydroxylamine and derivatives thereof, formic acid, oxalic acid, ascorbic acid, hydrazine and derivatives thereof, dithiothreitol (DTT), phosphites, hydrophosphites, phosphorous acid and derivatives thereof, lithium aluminum hydride, diisobutylaluminum hydride, sodium borohydride, sulfites, tin(II) complexes, iron(II) complexes, zinc mercury amalgam, sodium amalgam, atomic hydrogen, or Lindlar catalyst.

According to a preferred embodiment metallic silver nanoparticles are prepared by an in-situ reduction under mixing of silver oxide with a reductant. The reductant comprises preferably at least 50 wt % of formic acid relative to the total weight of the reductant.

The pH of the metallic nanoparticle dispersion is preferably between 7 and 10, more preferably between 7.4 and 9.0.

Printing or Coating Fluid

A metallic printing or coating fluid, also referred to respectively as a metallic ink or a metallic coating solution, is prepared from the metallic nanoparticle dispersion defined above. The printing or coating fluid may be prepared from the low concentrated (low viscous fluid) or the highly concentrated (paste) metallic nanoparticle dispersion described above.

The metallic nanoparticles dispersion may be directly used as a metallic printing or coating fluid. However, to optimize the coating or printing properties, and also depending on the application for which it is used, additives such as reducing agents, wetting/levelling agents, dewetting agents, rheology modifiers, adhesion agents, tackifiers, humectants, jetting agents, curing agents, biocides or antioxidants may be added to the metallic nanoparticle dispersion.

Preferably, the total amount of additives is between 0 and 10 wt %, more preferably between 0.5 and 6 wt %, and even more preferably between 1 and 4 wt %, relative to the total weight of the metallic printing or coating fluid.

Also diluents may be added to the metallic dispersions when preparing the metallic printing or coating fluids. The amount of these optional diluents is preferably less than 75 wt %, more preferably less than 60 wt % relative to the total weight of the ink. The diluents may be selected from alcohols, aromatic hydrocarbons, ketones, esters, aliphatic hydrocarbons, higher fatty acids, carbitols, cellosolves, and higher fatty acid esters. Suitable alcohols include methanol, ethanol, propanol, 1-butanol, 1-pentanol, 2-butanol, t-butanol. Suitable aromatic hydrocarbons include toluene, and xylene. Suitable ketones include methyl ethyl ketone, methyl isobutyl ketone, 2,4-pentanedione and hexa-fluoroacetone. Also glycol, glycolethers, N,N-dimethyl-acetamide, N,N-dimethylformamide may be used.

Such diluents may be added for example to the highly concentrated metallic nanoparticle dispersions (paste)

described above. The amount of diluent depends on the desired viscosity of the printing or coating fluid.

The preparation of the metallic printing or coating fluids comprises the addition of the optional additives and/or diluents to the metallic nanoparticle dispersion by using a homogenization technique such as stirring, high shear mixing, ultra-sonication, or a combination thereof. The homogenization step can be carried out at elevated temperature up to 100° C.

In a preferred embodiment, the homogenization step is carried out at temperature equal or below 60° C.

Metallic Layers or Patterns

The thin layers or patterns printed or coated from the metallic printing or coating fluids can be rendered conductive at lower sintering temperatures compared to those obtained with conventional metallic printing or coating fluids. Therefore, conductive thin layers or patterns made from the metallic printing or coating fluids can be coated or printed on flexible substrates that can not withstand thermal treatment at high temperature, such as for example PET.

The metallic layers or patters are prepared by a method comprising the steps of applying a printing or coating fluid as defined above on a substrate followed by a sintering step.

Multiple metallic layers or patterns, i.e. a stack of patterned or unpatterned layers, may be applied on a substrate. The substrate referred to in the method of preparing the metallic layers or patterns thus also encompass a previously applied metallic layer or pattern.

Metallic layers or patterns may be realized by an inkjet method. The viscosity of the printing fluid measured at jetting temperature is preferably between 4 and 30 mPa·s, more preferably between 5 and 20 mPa·s.

The metallic layers or patterns may also be realized by any conventional printing techniques such as flexography, offset, gravure or screen printing or by any conventional coating technique such as spray coating, blade coating, slot die coating.

After the layers or patterns are applied on the substrate, a sintering step, also referred to as curing step, is carried out. During this sintering step, solvents evaporate and the metallic particles sinter together. Once a continuous percolating network is formed between the metallic particles, the layers or patterns become conductive. Conventional sintering is carried out by applying heat. The sintering temperature and time are dependent on the substrate used and on the composition of the metallic layer or pattern. The sintering step for curing the metallic layers may be performed at a temperature below 250° C., preferably below 200° C., more preferably below 180° C., most preferably below 160° C.

The sintering time may be less than 60 minutes, preferably between 2 and 30 minutes and more preferably between 3 and 20 minutes, depending on the selected temperature, substrate and composition of the metallic layers.

However, instead of or in addition to the conventional sintering by applying heat, alternative sintering methods such as exposure to an Argon laser, to microwave radiation, to UV radiation or to low pressure Argon plasma, photonic curing, plasma or plasma enhanced, electron beam or pulse electric current sintering may be used.

The metallic layers according to preferred embodiments of the present invention allow to use lower curing temperatures than the prior art processes. In consequence it is possible to use polymeric substrates that can not withstand thermal treatment at high temperature, such as for example PET. The curing time may also be substantially reduced leading to the possibility of having higher production per hour than the prior art processes. The conductivity of the metallic layers are maintained or even improved in certain cases.

The metallic layers or patterns may be used in various electronic devices or parts of such electronic devices as for example organic photo-voltaics (OPV's), inorganic photo-voltaics (c-Si, a-Si, CdTe, CIGS), OLED displays, OLED lighting, inorganic lighting, RFID's, organic transistors, thin film batteries, touch-screens, e-paper, LCD's, plasma, sensors, membrane switches or electromagnetic shielding.

EXAMPLES

Materials

All materials used in the following examples were readily available from standard sources such as ALDRICH CHEMICAL Co. (Belgium) and ACROS (Belgium) unless otherwise specified. All materials were used without further purification unless otherwise specified.

Thermoline PET/V109 was used as a substrate. It refers to a subbed polyester substrate having a thickness of 120 μm.

Silver oxide ($Ag_2O$) was prepared by the precipitation of silver nitrate in an alkaline aqueous solution of sodium hydroxide (33 wt. %) followed by filtration and drying.

$deH_2O$ is the abbreviation for deionized water.

HEX is the abbreviation for hexane, isomers mixture (CAS 110-54-3, CAS 96-37-7, CAS 96-14-0, CAS 107-83-5).

TOL is the abbreviation for toluene (CAS 108-88-3).

THF is the abbreviation for tetrahydrofuran (CAS 109-99-9)

MOP is the abbreviation for 1-methoxy-2-propanol (CAS 107-98-2).

NMP is the abbreviation for N-methyl pyrrolidone (CAS 872-50-4).

NEP is the abbreviation for N-ethyl pyrrolidone (CAS 2687-91-4).

2PY is the abbreviation for 2-pyrrolidone (CAS 616-45-5) from BASF AG.

NMF is the abbreviation for N-methyl formamide (CAS 123-39-7).

FORM is the abbreviation for formamide (CAS 75-12-7).

DMF is the abbreviation for N,N-dimethyl formamide (CAS 68-12-2).

DMAC is the abbreviation for dimethyl acetamide (CAS 127-19-5).

GBL is the abbreviation for gamma-butyrolactone (CAS 96-48-0).

DEGDEE is the abbreviation for diethylene glycol diethylether (CAS 112-36-7).

DVL is the abbreviation for δ-valerolactam (CAS 675-20-7).

ECL is the abbreviation for ε-valerolactam (CAS 105-60-2).

PD is a poly(1,3-dioxolane) comprising 3.8 mol % of 2,5-dimercapto-1,3,4-thiadiazole synthesized according to the procedure in EP-A 11194791.7 (filed on PVP 15K is a poly(vinyl pyrrolidone) from BASF AG having a molecular weight of 15000 Da.

PVP 30K is a poly(vinyl pyrrolidone) from BASF AG having a molecular weight of 30000 Da.

PVP 90K is a poly(vinyl pyrrolidone) from BASF AG having a molecular weight of 90000 Da.

PAA is a poly(acrylic acid) from ALLIED COLLOIDS MANUFACTURING CO LTD having a molecular weight of 12000 Da.

D190 is the abbreviation for DISPERBYK 190 (D190), a poly (acrylate/acrylic) block copolymer (40 wt % in water) from BYK CHEMIE GMBH.

PVA is a 8000 Da poly(vinylalcohol/vinylacetate; 60/40 mol %) copolymer from SHAWINIGAN.

Table 1 shows the chemical structures of some solvents used to obtain metallic nanoparticle dispersions according to preferred embodiments of the present invention (INV) and others used to prepare metallic nanoparticle dispersions for comparative purposes (COMP).

TABLE 1

| Solvent | Structure |
|---|---|
| Water (COMP) | $H_2O$ |
| Hexane (COMP) | [structure] |
| Toluene (COMP) | [structure] |
| THF (COMP) | [structure] |
| MOP (COMP) | [structure] |
| NMP (COMP) | [structure] |
| NEP (COMP) | [structure] |
| NMF (COMP) | [structure] |
| Formamide (COMP) | [structure] |

TABLE 1-continued

| Solvent | Structure |
|---|---|
| DMF (COMP) | [structure] |
| DMAC (COMP) | [structure] |
| GBL (COMP) | [structure] |
| DEGDEE (COMP) | [structure] |
| 2PY (INV) | [structure] |
| DVL (INV) | [structure] |
| ECL (INV) | [structure] |

Conductivity Measurements

The surface resistance (SER) of the coated conductive layers was measured in a room conditioned to a temperature of 25° C. and a relative humidity of 30% by contacting the coated layer with parallel copper electrodes of equal width and at a distance equal to their width, treated with silver filled rubber contact material, each 35 mm long and 35 mm apart and capable of forming line contacts, the electrodes being separated by a Teflon® insulator. This enabled a direct measurement of the SER to be performed when coated layers were slitted at equal width as the electrodes.

If the surface resistance (SER) was less than 0.7Ω/ a four-point probe sheet resistance measurement, using a four-point collinear probe, was used to remove measurement errors due to lead resistance and error contact resistances due to the probe. The surface or sheet resistance was calculated by the following formula:

$$SER = (\pi/\ln 2)(V/I)$$

wherein

SER is the surface resistance of the layer expressed in Ω/;

Π is a mathematical constant, approximately equal to 3.14;

ln 2 is a mathematical constant equal to the natural logarithmic of value 2, approximately equal to 0.693;

V is voltage measured by voltmeter of the four-point probe measurement device;

I is the source current measured by the four-point probe measurement device.

The conductivity, expressed as percentage of the bulk silver conductivity (% bulk silver), was calculated according to the following formula:

$$\text{Conductivity} = 100 \times \sigma/\sigma_{(Ag)} = 100/[\text{SER} * h * \sigma_{(Ag)})] \times 10^5$$

wherein

σ is the specific conductivity of the layer expressed in S/cm;

SER is the surface resistance of the layer expressed in Ω/;

h the dry layer thickness expressed in μm; and $\sigma_{(Ag)}$ is the silver specific conductivity, equal to 6.3 $10^5$ S/cm.

Coated or printed layers of sufficient conductivity exhibit a conductivity of at least 4% expressed as percentage of the bulk silver conductivity.

Example 1

This example illustrates the preparation of Metallic Nanoparticles Dispersions (MND), using the solvents listed in Table 1. Table 2 shows the composition of each MND.

Preparation of a MND-01

8 g of silver oxide was stirred in 42.2 g of deionized water (deH$_2$O) (grey suspension) in a 200 mL reactor for 30 minutes at 23° C. 1.04 mL of formic acid was added to the reaction mixture at 23° C. by using an automated syringe (flow=0.1 mL/min). The black reaction mixture containing 15 wt % of metallic silver was additionally stirred for 2 hours.

Preparation of MND-02 to MND-13

The preparation of MND-02 to MND-13 followed the procedure described above for the preparation of MND-01 by replacing the deionized water by hexane, toluene, THF, MOP, NMP, NEP, NMF, formamide, DMF, DMAC, GBL or DEGDEE, as indicated in Table 2.

Preparation of MND-14

6 g of silver oxide was stirred in 30.33 g of 2PY (grey suspension) for 15 minutes at 23° C. 0.8 mL of formic acid was added to the reaction mixture at 23° C. by using an automated syringe (flow=0.1 mL/min). The black reaction mixture containing 15 wt % of metallic silver was additionally stirred for 2 hours at 23° C.

Preparation of MND-15 and MND-16

5 g of silver oxide was stirred in a mixture of 10.74 g of ECL and 7.16 g of ethanol (grey suspension) for 240 minutes at 23° C. 0.65 g of formic acid was added to the reaction mixture at 23° C. by using an automated syringe (flow=1 mL/min). The black reaction mixture containing 20.6 wt % of metallic silver was additionally stirred for 2 hours at 23° C. to obtain MND-15.

MND-16 followed the procedure described for the preparation of MND-15 by replacing ECL by DVL, as indicated in Table 2.

Preparation of MND-17

8 g of silver oxide was added to a solution of PVP 15K in 2PY (3.41 wt %) and stirred for 30 minutes at 23° C. (grey suspension). 1.04 mL of formic acid was added to the reaction mixture at 23° C. by using an automated syringe (flow=0.1 mL/min). The black reaction mixture containing 12 wt % of metallic silver and 3 wt % of PVP 15K was additionally stirred for 2 hours at 23° C.

Preparation of MND-18 to MND-20

The preparation of MND-18, MND-19 and MND-20 followed the procedure described for the preparation of MND-17 by replacing PVP 15K by PD, D190 and PVA, respectively.

Preparation of MND-21

8 g of silver oxide was added to a solution of PVP 30K in 2PY (3.41 wt %) and stirred for 30 minutes at 23° C. (grey suspension). 1.04 mL of formic acid was added to the reaction mixture at 23° C. by using an automated syringe (flow=0.1 mL/min). The black reaction mixture containing 12 wt % of metallic silver and 3 wt % of PVP 30K was additionally stirred for 2 hours at 60° C.

Preparation of MNCD-22 and MND-23

The preparation of MND-22 and MND-23 followed the procedure described for the preparation of MND-21 by replacing PVP 30K by PVP 90K and PAA, respectively.

The composition of MND-01 to MND-23 is shown in Table 2.

TABLE 2

| MND | Solvent | Polymeric dispersant | wt % metallic nanoparticles | wt % Polymeric dispersant |
|---|---|---|---|---|
| MND-01 (COMP) | Water | No | 15.0 (Ag) | 0 |
| MND-02 (COMP) | HEX | No | 15.0 (Ag) | 0 |
| MND-03 (COMP) | TOL | No | 15.0 (Ag) | 0 |
| MND-04 (COMP) | THF | No | 15.0 (Ag) | 0 |
| MND-05 (COMP) | MOP | No | 15.0 (Ag) | 0 |
| MND-06 (COMP) | NMP | No | 15.0 (Ag) | 0 |
| MND-07 (COMP) | NEP | No | 15.0 (Ag) | 0 |
| MND-08 (COMP) | NMF | No | 15.0 (Ag) | 0 |
| MND-09 (COMP) | FORM | No | 15.0 (Ag) | 0 |
| MND-10 (COMP) | DMF | No | 15.0 (Ag) | 0 |
| MND-11 (COMP) | DMAC | No | 15.0 (Ag) | 0 |
| MND-12 (COMP) | GBL | No | 15.0 (Ag) | 0 |
| MND-13 (COMP) | DEGDEE | No | 15.0 (Ag) | 0 |
| MND-14 (INV) | 2PY | No | 15.0 (Ag) | 0 |
| MND-15 (INV) | ECL | No | 20.6 (Ag) | 0 |
| MND-16 (INV) | DVL | No | 20.6 (Ag) | 0 |
| MND-17 (INV) | 2PY | PVP 15K | 12.0 (Ag) | 3.0 |
| MND-18 (INV) | 2PY | PD | 12.0 (Ag) | 3.0 |
| MND-19 (INV) | 2PY | D190 | 12.0 (Ag) | 3.0 |
| MND-20 (INV) | 2PY | PVA | 12.0 (Ag) | 3.0 |
| MND-21 (INV) | 2PY | PVP 30K | 12.0 (Ag) | 3.0 |
| MND-22 (INV) | 2PY | PVP 90K | 12.0 (Ag) | 3.0 |
| MND-23 (INV) | 2PY | PAA | 12.0 (Ag) | 3.0 |

Example 2

This example illustrates the preparation of the metallic printing or coating fluids MF-01 to MF-23.

Metallic printing or coating fluids MF-01 to MF-23 were prepared by applying an ultrasound treatment (10 minutes, 75% power) to MND-01 to MND-23.

TABLE 3

| Metallic Fluid (MF) | MND | Metallic nanoparticles |
|---|---|---|
| MF-01 (COMP) | MND-01 (COMP) | Ag |
| MF-02 (COMP) | MND-02 (COMP) | Ag |
| MF-03 (COMP) | MND-03 (COMP) | Ag |
| MF-04 (COMP) | MND-04 (COMP) | Ag |
| MF-05 (COMP) | MND-05 (COMP) | Ag |
| MF-06 (COMP) | MND-06 (COMP) | Ag |
| MF-07 (COMP) | MND-07 (COMP) | Ag |
| MF-08 (COMP) | MND-08 (COMP) | Ag |
| MF-09 (COMP) | MND-09 (COMP) | Ag |
| MF-10 (COMP) | MND-10 (COMP) | Ag |
| MF-11 (COMP) | MND-11 (COMP) | Ag |

TABLE 3-continued

| Metallic Fluid (MF) | MND | Metallic nanoparticles |
|---|---|---|
| MF-12 (COMP) | MND-12 (COMP) | Ag |
| MF-13 (COMP) | MND-13 (COMP) | Ag |
| MF-14 (INV) | MND-14 (INV) | Ag |
| MF-15 (INV) | MND-15 (INV) | Ag |
| MF-16 (INV) | MND-16 (INV) | Ag |
| MF-17 (INV) | MND-17 (INV) | Ag |
| MF-18 (INV) | MND-18 (INV) | Ag |
| MF-19 (INV) | MND-19 (INV) | Ag |
| MF-20 (INV) | MND-20 (INV) | Ag |
| MF-21 (INV) | MND-21 (INV) | Ag |
| MF-22 (INV) | MND-22 (INV) | Ag |
| MF-23 (INV) | MND-23 (INV) | Ag |

Example 3

This example illustrates that stable metallic printing or coating fluids can be produced, even in the absence of a polymeric dispersant, by using a dispersion media according to preferred embodiments of the present invention.

The physical state of the metallic printing or coating fluids was evaluated immediately after their preparation and after 24 hours of storage at room temperature. The results are given in Table 4. "STABLE" means that no flocculation, precipitation or jellification of the metallic printing or coating fluids was observed during their preparation and their storage for 24 hours at room temperature. "FLOC" means that flocculation of the metallic printing or coating fluids (phase separation) was observed.

TABLE 4

| MF | Physical State | Polymeric Dispersant | Metallic Particle |
|---|---|---|---|
| MF-01 (COMP) | FLOC | No | Ag |
| MF-02 (COMP) | FLOC | No | Ag |
| MF-03 (COMP) | FLOC | No | Ag |
| MF-04 (COMP) | FLOC | No | Ag |
| MF-05 (COMP) | FLOC | No | Ag |
| MF-06 (COMP) | FLOC | No | Ag |
| MF-07 (COMP) | FLOC | No | Ag |
| MF-08 (COMP) | FLOC | No | Ag |
| MF-09 (COMP) | FLOC | No | Ag |
| MF-10 (COMP) | FLOC | No | Ag |
| MF-11 (COMP) | FLOC | No | Ag |
| MF-12 (COMP) | FLOC | No | Ag |
| MF-13 (COMP) | FLOC | No | Ag |
| MF-14 (INV) | STABLE | No | Ag |
| MF-15 (INV) | STABLE | No | Ag |
| MF-16 (INV) | STABLE | No | Ag |
| MF-17 (INV) | STABLE* | Yes | Ag |
| MF-18 (INV) | STABLE | Yes | Ag |
| MF-19 (INV) | STABLE | Yes | Ag |
| MF-20 (INV) | STABLE* | Yes | Ag |
| MF-21 (INV) | STABLE | Yes | Ag |
| MF-22 (INV) | STABLE | Yes | Ag |
| MF-23 (INV) | STABLE** | Yes | Ag |

*presence of large particles
**very viscous

From Table 4, it is clear that that the metallic printing or coating fluids prepared from metallic nanoparticle dispersions comprising a dispersion medium according to preferred embodiments of the present invention are stable, even in the absence of a polymeric dispersant. It has even been observed that the metallic nanoparticle dispersions according to preferred embodiments of the present invention in the absence of a polymeric dispersant had a better dispersion quality, for example less large particles and a lower viscosity.

Example 4

This example illustrates the preparation and properties of Coated Layers CL-01 to CL-18 from the metallic printing or coating fluids.

The Coated layers (CL) were prepared by applying the metallic printing or coating fluids as defined in Table 5, onto a subbed polyester substrate having a thickness of 120 µm. The fluids were applied at a wet coating thickness of 20 µm and dried at 23° C. for 10 minutes. The composition, the curing conditions and the electrical properties of the coated layers are given in Table 5.

TABLE 5

| Conductive Layer (CL) | Metallic Fluid (MF) | Curing Temp. (° C.) | Curing Time (min) | Resistivity ($\Omega$/) | Conductivity (% bulk Ag) |
|---|---|---|---|---|---|
| CL-01 | MF-01 (COMP) | 150 | 20 | $20 \times 10^6$ | 0 |
| CL-02 | MF-02 (COMP) | 150 | 20 | $20 \times 10^6$ | 0 |
| CL-03 | MF-03 (COMP) | 150 | 20 | $20 \times 10^6$ | 0 |
| CL-04 | MF-04 (COMP) | 150 | 20 | $20 \times 10^6$ | 0 |
| CL-05 | MF-05 (COMP) | 150 | 20 | $20 \times 10^6$ | 0 |
| CL-06 | MF-06 (COMP) | 150 | 20 | $20 \times 10^6$ | 0 |
| CL-07 | MF-07 (COMP) | 150 | 20 | $20 \times 10^6$ | 0 |
| CL-08 | MF-08 (COMP) | 150 | 20 | $20 \times 10^6$ | 0 |
| CL-09 | MF-09 (COMP) | 150 | 20 | $20 \times 10^6$ | 0 |
| CL-10 | MF-10 (COMP) | 150 | 20 | $20 \times 10^6$ | 0 |
| CL-11 | MF-11 (COMP) | 150 | 20 | $20 \times 10^6$ | 0 |
| CL-12 | MF-12 (COMP) | 150 | 20 | $20 \times 10^6$ | 0 |
| CL-13 | MF-13 (COMP) | 150 | 20 | $20 \times 10^6$ | 0 |
| CL-14 | MF-14 (INV) | 130 | 5 | 0.612 | 7.9 |
| CL-15 | MF-14 (INV) | 130 | 10 | 0.498 | 9.6 |
| CL-16 | MF-14 (INV) | 130 | 20 | 0.604 | 8.0 |
| CL-17 | MF-15 (INV) | 140 | 20 | 0.9 | 4.3 |
| CL-18 | MF-16 (INV) | 140 | 20 | 0.8 | 5.5 |

The layers coated from the dispersant-free metallic printing or coating fluids (MF-14, MF-15 and MF-16) comprising the dispersion medium according to preferred embodiments of the present invention (respectively 2PY, ECL and DVL) exhibit higher conductivities than any of the layers coated with comparative MF's when cured under the same conditions or even at lower curing temperatures or curing times.

It is clear that only the metallic fluids of the present invention allow a significant lowering of the curing temperature and of the curing time and still obtain a high enough conductivity of the metallic layers obtained thereof. Metallic layers with sufficient conductivity can be prepared by using the metallic fluids of the present invention at a curing temperature below 150° C. Coated or printed layers of sufficient conductivity exhibit a conductivity of at least 4% expressed in bulk silver conductivity.

Example 5

This example illustrates the preparation of conductive silver layers CL-01 to CL-13 and CL-16 to CL-25 prepared from the metallic printing or coating fluids MF-01 to MF-23.

The conductive layers CL-19 to CL-23 are prepared as described for CL-01 to CL-13 and CL-16 in example 4.

Table 6 gives an overview of the conductivity of the conductive layers in terms of whether or not the layers are conductive after curing for 20 minutes at 150° C. or lower. In addition table 6 also gives the metallic fluids from which the layers are prepared and whether or not those fluids are stable.

ductive layers, prepared from such fluids, having sufficient conductivity after curing them for 20 minutes at a temperature below 150° C. could be realized with fluids prepared from metallic nanoparticle dispersions comprising a dispersion medium according to the present invention and comprising no polymeric dispersant.

TABLE 6

| CL | MF | MF's physical state | Conductive after 20 min at <150° C. | Conductive after 20 min at 150° C. | Stable MF and conductive CL after 20 min at <150° C. |
|---|---|---|---|---|---|
| CL-01 | MF-01 (COMP) | FLOC | No | No | No |
| CL-02 | MF-02 (COMP) | FLOC | No | No | No |
| CL-03 | MF-03 (COMP) | FLOC | No | No | No |
| CL-04 | MF-04 (COMP) | FLOC | No | No | No |
| CL-05 | MF-05 (COMP) | FLOC | No | No | No |
| CL-06 | MF-06 (COMP) | FLOC | No | No | No |
| CL-07 | MF-07 (COMP) | FLOC | No | No | No |
| CL-08 | MF-08 (COMP) | FLOC | No | No | No |
| CL-09 | MF-09 (COMP) | FLOC | No | Yes | No |
| CL-10 | MF-10 (COMP) | FLOC | No | No | No |
| CL-11 | MF-11 (COMP) | FLOC | No | No | No |
| CL-12 | MF-12 (COMP) | FLOC | No | No | No |
| CL-13 | MF-13 (COMP) | FLOC | No | No | No |
| CL-16 | MF-14 (INV) | STABLE | Yes | Yes | Yes |
| CL-17 | MF-15 (INV) | STABLE | Yes | Yes | Yes |
| CL-18 | MF-16 (INV) | STABLE | Yes | Yes | Yes |
| CL-19 | MF-17 (INV) | STABLE* | No | Yes | No |
| CL-20 | MF-18 (INV) | STABLE | No | Yes | No |
| CL-21 | MF-19 (INV) | STABLE | No | No | No |
| CL-22 | MF-20 (INV) | STABLE* | No | No | No |
| CL-23 | MF-21 (INV) | STABLE | No | No | No |
| CL-24 | MF-22 (INV) | STABLE | No | No | No |
| CL-25 | MF-23 (INV) | STABLE** | No | No | No |

*presence of large particles;
**very viscous.

From Table 6 it is clear that only the inventive metallic printing or conductive fluids (MF) are stable fluids. It is also clear from Table 6 that conductive layers prepared from inventive metallic fluids comprising a polymeric dispersant (CL-19 to CL-25) have a lower conductivity compared to those having no polymeric dispersant (CL-16 to CL-18). It is also clear that the type of polymeric dispersant used in the fluids also has an influence on the conductivity of the layers prepared from those fluids (compare for example CL-19 and CL-20 with CL-21 to CL-25).

The results from Table 6 thus illustrate that the combination of stable metallic printing or coating fluids and con- Example 6

This example illustrates the preparation of metallic nanoparticles dispersions (MND) by using, in addition to a specific solvent according to the present invention, a co-solvent.

Preparation of MND-24 and MND-25

15 g of silver oxide was stirred in a mixture of 27 g of 2PY and 27 g of ethanol for 4 hours at 23° C. 1.65 mL of formic acid was added to the reaction mixture at 23° C. by using an automated syringe (flow=1 mL/min). The black reaction mixture was additionally stirred for 2 hours at 23° C. MND-24 contains 20.5 wt % of metallic silver nanoparticles.

The 27 g of ethanol in MND-24 was evaporated in a ventilated oven thermostated at 50° C., resulting in the metallic nanoparticles composition MND-25 (34.1 wt % of silver nanoparticles).

Preparation of MND-26

24 g of silver oxide was stirred in a mixture of 27 g of 2PY and 27 g of ethanol for 4 hours at 23° C. 2.64 mL of formic acid was added to the reaction mixture at 23° C. by using an automated syringe (flow=1 mL/min). The black reaction mixture was additionally stirred for 2 hours at 23° C. The ethanol was evaporated in a ventilated oven thermostated at 50° C. The resulting MND-26 contains 45.3 wt % of silver nanoparticles.

Preparation of MND-27 to MND-29

5 g of silver oxide was stirred in a mixture of 7 g of 2PY and 11 g of ethanol for 4 hours at 23° C. 0.55 mL of formic acid was added to the reaction mixture at 23° C. by using an automated syringe (flow=1 mL/min). The black reaction mixture was additionally stirred for 2 hours at 23° C. MND-27 contains 20.5 wt % of metallic silver nanoparticles.

The preparation of MND-28 followed the procedure of MND-27 by using 5 g of 2PY and 14 g of ethanol.

The preparation of MND-29 followed the procedure of MND-27 by using 3 g of 2PY and 15 g of ethanol.

Preparation of MND-30

5 g of silver oxide was stirred in a mixture of 9 g of 2PY and 9 g of methylethyl ketone (MEK) for 2 hours at 23° C. 0.55 mL of formic acid was added to the reaction mixture at 23° C. by using an automated syringe (flow=1 mL/min). The black reaction mixture was additionally stirred for 2 hours at 23° C. The 9 g MEK was evaporated in a ventilated oven thermostated at 50° C., resulting in the metallic nanoparticles composition MND-30 containing 34.1 wt % of silver nanoparticles.

TABLE 7

| MND | Ag nanoparticles (wt %) | Solvent (wt %) | Co-Solvent (wt %) |
|---|---|---|---|
| MND-24 (INV) | 20.5 | 2PY 39.75 | ethanol 39.75 |
| MND-25 (INV) | 34.1 | 2PY 65.90 | no |
| MND-26 (INV) | 45.3 | 2PY 54.70 | no |
| MND-27 (INV) | 20.5 | 2PY 30.90 | ethanol 48.60 |
| MND-28 (INV) | 20.5 | 2PY 20.90 | ethanol 58.60 |
| MND-29 (INV) | 20.5 | 2PY 13.20 | ethanol 66.30 |
| MND-30 (INV) | 34.1 | 2PY 65.60 | no |

Example 7

This example illustrates the preparation of metallic printing or coating fluids MF-24 to MF-31 from the metallic nanoparcticle dispersions as defined in Table 8.

Metallic Fluids MF-24 to MF-28 were prepared by applying an ultrasound treatment (10 minutes, 75% power) to the metallic nanoparcticle dispersions as defined in Table 8.

The Metallic Fluids MF-29, MF-30 and MF-31 comprising 33 wt % 1,2-butanediol relative to their total weight were prepared by the addition of 1,2-butanediol, as diluent, to MND-27, MND-28 and MND-29.

TABLE 8

| Metallic composition | Metallic Nanoparticles Dispersion | Metallic nanoparticles | diluent |
|---|---|---|---|
| MF-24 (INV) | MND-24 (INV) | Ag | No |
| MF-25 (INV) | MND-25 (INV) | Ag | No |
| MF-26 (INV) | MND-26 (INV) | Ag | No |
| MF-27 (INV) | MND-27 (INV) | Ag | No |
| MF-28 (INV) | MND-30 (INV) | Ag | No |
| MF-29 (INV) | MND-27 (INV) | Ag | 1,2-butanediol |
| MF-30 (INV) | MND-28 (INV) | Ag | 1,2-butanediol |
| MF-31 (INV) | MND-29 (INV) | Ag | 1,2-butanediol |

Example 8

This example illustrates the advantages for preparing stable and highly concentrated metallic printing or coating fluids by using a specific solvent of the present invention in combination with a co-solvent.

The physical state of the metallic printing or coating fluids was evaluated after their preparation and after 24 hours of storage at room temperature. The results are given in Table 9. "STABLE" means that no flocculation, precipitation or jellification of the metallic compositions was observed during the preparation. "FLOC" means that flocculation of the metallic compositions was observed (phase separation).

Coated layers (CL's) were prepared by applying the metallic printing or coating fluids, as defined in Table 8, onto a subbed polyester substrate having a thickness of 120 μm. The fluids were applied at a wet coating thickness of 20 μm, dried at 23° C. for 10 minutes.

The composition and electrical properties of the coated layers CL-26 to CL-33, after curing at 150° C. during 20 minutes, are given in Table 9.

TABLE 9

| CL | MF | Ag wt % | MF's physical state | Resistivity (Ohm/square) | Conductivity (% bulk Ag) |
|---|---|---|---|---|---|
| CL-26 | MF-24 | 20.5 | STABLE | 0.326 | 11.9 |
| CL-27 | MF-25 | 34.1 | STABLE | 0.190 | 8.0 |
| CL-28 | MF-26 | 45.3 | STABLE | 0.153 | 7.1 |
| CL-29 | MF-27 | 20.5 | STABLE | 0.403 | 9.6 |
| CL-30 | MF-28 | 34.1 | STABLE | 0.307 | 4.9 |
| CL-31 | MF-29 | 22.7 | STABLE | 0.402 | 6.9 |
| CL-32 | MF-30 | 22.7 | STABLE | 0.277 | 9.6 |
| CL-33 | MF-31 | 22.7 | STABLE | 0.336 | 7.1 |

It is clear from the results shown in Table 9 that stable metallic printing and coating fluids can be prepared from metallic nanoparticle dispersions comprising a specific solvent according to the present invention and a co-solvent, in this case ethanol (MF-24 to MF-27).

Removal of the co-solvent allows the preparation of highly concentrated (containing 30 wt % or more of metallic nanoparticles) but still stable metallic printing or coating fluids (see MF-25, MF-26 and MF-28).

It also clear from Table 9 that metallic layers with sufficient conductivity, a conductivity of at least 4% expressed in bulk silver conductivity, can be prepared from the metallic printing and coating fluids of the present invention.

The results of Table 9 also indicates that the addition of a diluent, for example 1,2-butanediol, to the metallic nanoparticle dispersions while preparing the metallic fluids, does not badly influences the conductivity of the metallic layers prepared from such fluids (see CL-31 to CL-33).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of preparing a metallic nanoparticle dispersion comprising the steps of:
   providing metallic precursor nanoparticles;
   providing a dispersion medium including a solvent according to Formula I:

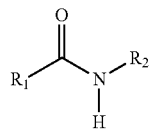

Formula I wherein
   $R_1$ and $R_2$ represent an optionally substituted alkyl group; and
   $R_1$ and $R_2$ may form a ring; and
   dispersing at least 5 wt % of the metallic precursor nanoparticles in the dispersion medium including the solvent according to the Formula I; wherein
   the dispersing step includes an in-situ reduction while mixing the metallic precursor nanoparticles with a reductant.

2. The method according to claim 1, wherein the dispersion medium includes a solvent according to Formula II:

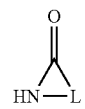

Formula II wherein
L is an optionally substituted linear or branched $C_2$-$C_{11}$ alkylene group.

3. The method according to claim 2, wherein L in Formula II is an optionally substituted $C_3$-$C_5$ alkylene group.

4. The method according to claim 1, wherein the dispersion medium includes a solvent selected from the group consisting of 2-pyrrolidone, 4-hydroxy-2-pyrrolidone, δ-valerolactam, or ϵ-caprolactam.

5. The method according to claim 1, wherein the metallic nanoparticle dispersion further includes less than 5 wt % of a polymeric dispersant relative to the total weight of the metallic nanoparticle dispersion.

6. The method according to claim 1, wherein the dispersing step further includes precipitation, milling, in-situ synthesis, or a combination thereof.

7. The method according to claim 1, wherein the metallic precursor nanoparticles are selected from a metal oxide, a metal hydroxide, a metal salt, or a combination thereof.

8. The method according to claim 7, wherein the metal oxide includes silver oxide.

9. The method according to claim 8, wherein the reductant includes at least 50 wt % formic acid relative to a total weight of the reductant.

10. The method according to claim 1, further comprising performing an evaporation step, a sedimentation step, or an ultrafiltration step in order to remove at least a portion of the dispersion medium.

11. A method of preparing a metallic layer or pattern comprising the step of:
    applying the metallic nanoparticle dispersion prepared according to the method of claim 1 on a substrate followed by a sintering step.

* * * * *